United States Patent Office 2,721,882
Patented Oct. 25, 1955

2,721,882

HALOBICYCLOALKENYL ARYL ETHERS AND METHOD OF PREPARATION THEREOF

Louis Schmerling, Riverside, Ill., assignor to Universal Oil Products Company, Des Plaines, Ill., a corporation of Delaware No Drawing. Application August 7, 1953, Serial No. 373,057

11 Claims. (Cl. 260—612)

This invention relates to new compositions of matter comprising halobicycloalkenyl aryl ethers and more particularly to a method of preparing the aforementioned compounds.

An object of this invention is to prepare new compositions of matter comprising halobicycloalkenyl aryl ethers.

A further object of this invention is to prepare new compositions of matter comprising polyhalo substituted bicycloalkenyl aryl ethers.

One embodiment of this invention resides in the process for the preparation of a halobicycloalkenyl aryl ether which comprises reacting a conjugated halocycloalkadiene with an alkenyl aryl ether.

Another embodiment of this invention is found in the process for the preparation of a halobicycloalkenyl aryl ether, said process comprising the reaction of a conjugated halocycloalkadiene with an alkenyl aryl ether.

A specific embodiment of this invention is found in a process for the preparation of a polyhalobicycloalkenyl aryl ether which comprises reacting polyhalocyclopentadiene with an alkenyl aryl ether.

A more specific embodiment of this invention is found in a process for the preparation of a hexachlorobicycloalkenyl aryl ether which comprises reacting hexachlorocyclopentadiene with allyl phenyl ether and recovering the resultant 1,2,3,4,7,7-hexachloro-5-phenoxymethylbicyclo(2.2.1)-2-heptene.

Other objects and embodiments of this invention referring to alternative conjugated halocycloalkadienes and alternative alkenyl aryl ethers which may be used in this process will be referred to in the following further detailed description of the invention.

It has now been discovered that a polyhalobicycloalkenyl aryl ether, which may be used in the preparation of resins, plastics, pharmaceuticals, insecticides and other products, may be prepared by reacting a conjugated halocycloalkadiene with an alkenyl aryl ether under condensation producing conditions. These halobicycloalkenyl aryl ethers have the formula:

I.

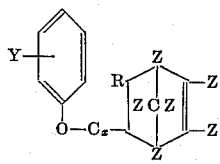

in which $x=1$ or $0$, $R=H$ or an alkyl group, $Y=$ a halogen, hydrogen, amino, hydroxyl, cyano, nitro, or sulfate substituent and $Z=$ a halogen or a hydrogen substituent, at least one of which is halogen.

Conjugated halocycloalkadienes which may be used in this process include chlorinated cycloalkadienes including tetrachlorocyclopentadiene, hexachlorocyclopentadiene, etc., tetrabromocyclopentadiene, hexabromocyclopentadiene, etc.

The ethers which are used in this process comprise alkenyl aryl ethers of the general formula:

II.

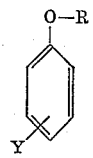

in which R represents an unsaturated aliphatic carbon chain, the double bonds being in either the α- or β-position and Y represents a hydrogen, halogen, nitro, amino, hydroxyl, cyano or sulfate substituent. Examples of the above mentioned alkenyl aryl ethers include vinyl phenyl ether, allyl phenyl ether, p-chlorophenyl allyl ether, p-hydroxyphenyl allyl ether, p-chlorophenyl vinyl ether, p-nitrophenyl allyl ether, p-nitrophenyl vinyl ether, etc., 1-butenyl phenyl ether, 2-butenyl phenyl ether, 1-pentenyl phenyl ether, 2-pentenyl phenyl ether, p-chlorophenyl-1-butenyl ether, p-nitrophenyl-1-butenyl ether, etc., crotyl α-naphthyl ether, crotyl β-naphthyl ether, etc. The position of the unsaturated bond in the unsaturated side chain of the ether will determine the number of carbon atoms and of $x$ and R in the hereinbefore set forth formula. For example, if the unsaturated bond is in an α position, $x$ will be 0; if the unsaturated bond is in the β position, $x$ will equal 1. R will depend upon the length of the carbon chain, if there are more than 2 carbon atoms in the chain and the unsaturated bond is in the α position R equals the excess of carbon atoms over 2. A preferred ether in this process comprises allyl phenyl ether, which, when condensed with hexachlorocyclopentadiene produces 1,2,3,4,7,7-hexachloro-5-phenoxymethylbicyclo(2.2.1)-2-heptene according to the following equation:

III.

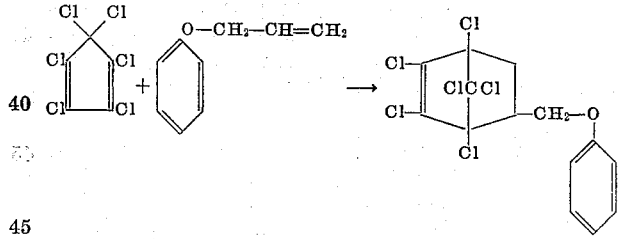

When 1-butenyl phenyl ether is reacted with hexachloropentadiene the reaction proceeds according to the following equation:

IV.

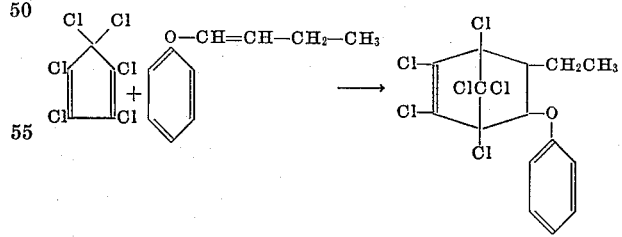

the resulting product being 1,2,3,4,7,7-hexachloro-6-ethyl-5-phenoxybicyclo(2.2.1)-2-heptene.

The condensation of the alkenyl aryl ether and the conjugated halocycloalkadiene will occur at elevated temperatures, the particular temperature depending upon the reactants used in the process, and will be in the range of from about room temperature to about 250° C. or more, the preferred range being from about 80° C. to about 200° C.

The process of the present invention may be carried out in any suitable manner, and may be either a batch or continuous type of operation. When a batch type operation is used, a quantity of the starting materials, namely the alkenyl aryl ether and the conjugated polyhalocycloalkadiene (together with an inert diluent, such as an aromatic hydrocarbon, if desired) are added to a reaction vessel equipped with a stirring and heating device. The temperature of the reaction vessel is raised to the desired point and maintained thereat for a predetermined length of time, after which the vessel and the contents thereof are cooled to room temperature and the desired product, comprising a polyhalobicycloalkenyl aryl ether is separated from the unreacted starting material by conventional means, for example by fractional distillation.

Another method of operation in the present process is of the continuous type. In this process the reactants, comprising the alkenyl aryl ether and the conjugated polyhalocycloalkadiene, are led into a reaction vessel which is maintained at suitable operating conditions. The reaction zone may be an unpacked vessel or coil, or it may contain an absorbent packing material such as firebrick, alumina, dehydrated bauxite and the like. The condensation product of the alkenyl aryl ether and conjugated polyhalocycloalkadiene is separated from the reactor effluent, and the unconverted materials may be recycled to the reaction zone to form a portion of the starting materials.

The following example is given to illustrate the process of the present invention, which, however, is not intended to limit the generally broad scope of the present invention therewith.

EXAMPLE I

A mixture of 0.1 mol (13 g.) of allyl phenyl ether and 0.1 mol (27 g.) of hexachlorocyclopentadiene was heated at a temperature of 100° C. by means of a water bath for two hours. At the end of this time the water bath was removed and the mixture was heated to a temperature in the range of 175–185° C. for a period of ten hours. Water was added to the product which was then heated in order to distill off any low boiling material which may have been present. The residue from this distillation was taken up in ether, the ether distilled off, and the bottoms then distilled through an appropriate distillation apparatus under reduced pressure. The results of the distillation are given in the table below.

*Table II*

| Cut | Boiling Point, °C. | Pressure, mm. | Volume, cc. |
|---|---|---|---|
| 1 | 181–197 | 2.1 | 0.4 |
| 2 | 197–197 | 2.1 | 3.5 |
| 3 | 197–198 | 2.1 | 2.4 |
| 4 | 198–200 | 2.1 | 6.7 |
| 5 | 200–200 | 2.1 | 2.0 |
| Bottoms | | | 4.5 |

A 55% yield of the product, 1,2,3,4,7,7-hexachloro-5-phenoxymethylbicyclo(2.2.1)-2-heptene boiling at 197–200° C. at 2.1 mm. pressure was obtained. Cut 3 of the above mentioned table was analyzed with the following results:

Analysis: Calculated for $C_{14}H_{10}OCl_6$: C, 41.31; H, 2.48; Cl, 52.27. Found: C, 41.58; H, 2.90; Cl, 51.00.

I claim as my invention:

1. A hexahalo-aroxybicyclo(2.2.1)-2-heptene.
2. A hexachloro-aroxybicyclo(2.2.1)-2-heptene.
3. A hexachloro-aroxymethylbicyclo(2.2.1)-2-heptene.
4. 1,2,3,4,7,7-hexachloro - 5 - (phenoxymethyl)bicyclo-(2.2.1)-2-heptene.
5. A process for the preparation of a hexahalobicycloalkenyl aryl ether which comprises reacting a hexahalocyclopentadiene with an alkenyl aryl ether which is condensable with the first-mentioned reactant.
6. A process for the preparation of a hexachlorobicycloalkenyl aryl ether which comprises reacting hexachlorocyclopentadiene with an alkenyl aryl ether which is condensable with the first-mentioned reactant.
7. A process for the preparation of a hexachlorobicycloalkenyl aryl ether which comprises reacting hexachlorocyclopentadiene with an allyl aryl ether which is condensable with the first-mentioned reactant.
8. A process for the preparation of a hexachlorobicycloalkenyl aryl ether which comprises reacting hexachlorocyclopentadiene with a vinyl aryl ether which is condensable with the first-mentioned reactant.
9. A process for the preparation of a hexachlorobicycloalkenyl aryl ether which comprises reacting hexachlorocyclopentadiene with an allyl phenyl ether which is condensable with the rst-mentioned reactant.
10. A process for the preparation of a hexachlorobicycloalkenyl aryl ether which comprises reacting hexachlorocyclopentadiene with a vinyl phenyl ether which is condensable with the first-mentioned reactant.
11. A process for the preparation of a polyhalobicycloalkenyl aryl ether which comprises reacting hexachlorocyclopentadiene and phenyl allyl ether and recovering the resulting 1,2,3,4,7,7-hexachloro - 5 - (phenoxymethyl)bicyclo(2.2.1)-2-heptene.

References Cited in the file of this patent

UNITED STATES PATENTS

| | | |
|---|---|---|
| 2,421,597 | Bruson | June 3, 1947 |
| 2,606,910 | Herzfeld et al. | Aug. 12, 1952 |